Figure 1:
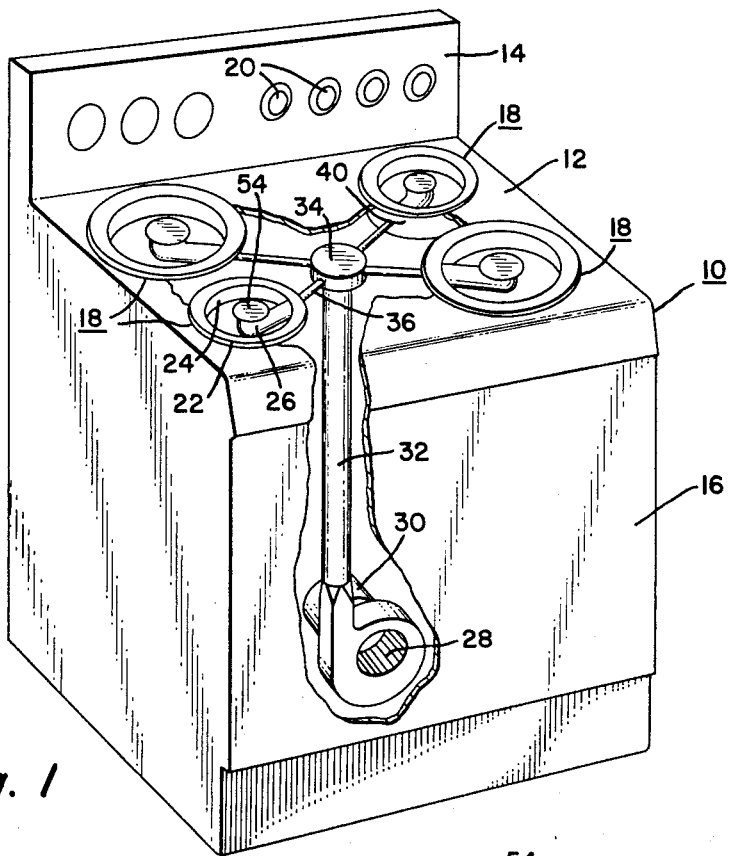

Jan. 26, 1965  R. S. GAUGLER  3,167,639
SURFACE COOKING UNIT FOR AN ELECTRIC RANGE
Filed Sept. 7, 1961

INVENTOR.
Richard S. Gaugler
BY
Frederick M. Ritchie
His Attorney

United States Patent Office 3,167,639
Patented Jan. 26, 1965

3,167,639
SURFACE COOKING UNIT FOR AN ELECTRIC RANGE
Richard S. Gaugler, Dayton, Ohio, assignor to General Motors Corporation, Detroit, Mich., a corporation of Delaware
Filed Sept. 7, 1961, Ser. No. 136,460
5 Claims. (Cl. 219—370)

This invention relates to a domestic appliance and more particularly to an improved electric range surface unit operating on the principle of convection heat transfer.

In the prior electric cooking art, ranges have been provided with tubular heating elements which are coiled in some fashion to support a utensil. The difficulty with such prior art units involves their retention of heat for a period of time after their deenergization as well as the difficulty encountered in cleaning such units. This invention proposes to replace the coiled tubular heating elements with a convection air unit which is very easy to clean and in which the means for inducing the convection currents is protected from excessive heat.

In general, the arrangement of this invention uses a central forced air blower located in the bottom of the range or in some other cool location to force air at a pressure of several inches of water to the surface cooking unit. This air is forced through a venturi section by a jet similar to the jet in a gas burner in such a manner as to entrain hot air returning from the cooking unit. An electric heating element is contained in the discharge end of the venturi section. By using this construction, any spillage of food or liquid will be caught in the housing surrounding the venturi section and can be drained therefrom by any convenient drain port provided in the housing. The remote location of the blower will prevent spillage from impairing the operation of the blower.

Accordingly, it is an object of this invention to provide an electric range with surface units which operate on the principle of convection heat transfer.

Another object of this invention is the provision of a convector type air cooking unit which is designed to facilitate cleaning thereof.

It is a further object of this invention to provide a convector cooking unit using recirculated air in which the recirculation is induced by the action of a forced air jet in a venturi.

A further object of this invention is the provision of a single blower in a remote portion of the range for providing the air supply to initiate the venturi action in each of the surface cooking units.

Further objects and advantages of the present invention will be apparent from the following description, reference being had to the accompanying drawings wherein preferred embodiments of the present invention are clearly shown.

Figure 2:
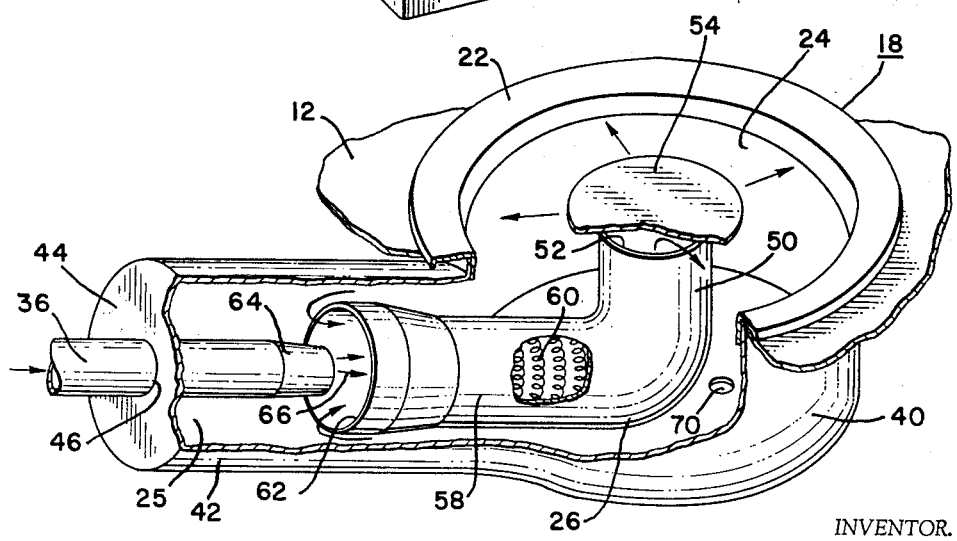

In the drawings:

FIGURE 1 is a perspective view of a range with parts broken away to show the convection air cooking units of this invention; and FIGURE 2 is a fragmentary sectional view with parts broken away to show in detail one of the convection air cooking units.

In accordance with this invention and with reference to FIGURE 1, a free-standing electric range 10 is illustrated. The range is conventional and is comprised of a cooking top 12, a control panel 14 and an oven section 16 below the cooking top. On the cooking top 12 there are disposed four surface cooking units 18, some of which are about 8" in diameter and others of which are approximately 6" in diameter. The cooking units 18 are adapted to be controlled respectively by power switches 20 on the control panel 14.

In general, each of the surface heating units 18 is comprised of a decorative annular trim ring 22 defining an open top chamber or air circulation space 24 in which is disposed the air supply and heater tube 26. Air is supplied by an impeller 28 driven by a motor 30 whenever any of the switches 20 are energized. A duct 32 directs the air to a manifold or collecting chamber 34 from which the air is then distributed through supply jet tubes 36 to the respective cooking units 18.

Turning now to FIGURE 2, the convector unit will be described more fully. The trim ring 22 may lay in snap-fitting relationship to the cooking top 12 of the range. Immediately therebelow and either integral with or connected to the trim ring 22 is an outer housing 40 which forms a supply air zone or cooking area 24 and a return air duct 25. Note that the chamber 24 is open along the plane coplanar with the trim ring 22. The return air duct 25 of the housing 40 is formed by a generally cylindrical end portion 42 which is closed by a plate 44 having an opening 46 for receiving in generally air-tight relationship the forced air supply tube 36. Within the outer housing 40 is the L-shaped heater tube 26 which forms a heated air supply duct and a heating element housing—an upwardly directed outlet terminal portion 50 leading to an outlet 52 just below the plane of the trim ring 22. A diverter cap or disk 54 has several depending tangs (not shown) which nest within the tube end 50 to hold the disk in spaced relationship with the outlet 52. The heated supply air is thereby baffled in order to divert the air as shown by the arrows along a radial path from the heater tube toward the trim ring 22. The heater tube 26 has a heating element section 58 which encloses an electrical resistance or heating element 60. The heating element 60 is selectively energized whenever its respective switch 20 is turned on. Note at this point, however, that the blower motor 30 is energized whenever any one of the four switches 20 is energized, but only the heating element for the particular unit controlled by the switch is energized.

At one end of the heater tube section 58 is a venturi which has an open inlet end 62 in line with a jet terminal portion 64 of the forced air supply duct 36. Thus, whenever the blower 28 is operated, air is forced into the heating element section 58 through the venturi as shown by the arrows at 66. The action of the venturi serves to suck in return air from the annular zone on the outside of the heater tube 48, thereby entraining the hot return air with the relatively cold makeup air. This creates a substantially recirculating air system which maintains cooking temperatures in the plane defined by the trim ring 22.

It is known that a convector unit of this type is going to lose some of the air due to leakage about the periphery of the trim ring. This invention recognizes the fact and uses the small amount of makeup air through the forced air supply 36 to induce the recirculation required.

Where it is desired to use the cooking unit 18, a utensil or pan is simply rested upon the diverter baffle 54 and the trim ring 22. The hot air will spread out beneath the bottom of the utensil and uniformly transfer heat thereto. In case of any spillover from the pan, a hole 70 has been provided in the bottom of the outer housing 40. This spillage may then leak to a slidably removable catch basin (not shown) disposed therebelow in accordance with conventional design.

It should now be seen that an improved air convection range surface heater has been provided which is easily cleanable. Further, a plurality of such surface heaters are designed to be powered by a remote forced air source which is suitable for providing air to each of the surface heaters. The forced air is used as the small amount of makeup occurring due to leakage from the convector unit and this makeup air is used to induce the recirculation through the use of a venturi connected to the heating chamber of the heater tube.

It has been found that twelve to fifteen inches of water pressure is sufficient for the primary air supply 36 in order to induce the proper recirculation. However, it should be understood that any pressures suitable for inducing the recirculation and carrying the heat from the remote heating element to the plane of the utensil bottom would be sufficient within the purview of this invention. Further, it should be understood that separate blowers such as 28 could be provided for each cooking unit if the design of the range so warranted.

While the embodiments of the present invention as herein disclosed constitute preferred forms, it is to be understood that other forms might be adopted.

What is claimed is as follows:

1. A surface cooking unit for an electric range comprising range top means having an opening therein, an annular support ring in said opening for supporting a utensil on the top of said range, said support ring and the bottom of said utensil defining a substantially closed air circulation space in said range top means, electrical heating means remote from said air circulation space and positioned in fixed relationship to said support ring in a manner to prevent straight line radiation from said heating means to said air circulation space, a tubular supply air passage means enclosing said heating means and having a supply inlet adjacent one side of said heating means and a supply outlet directed upwardly in a manner to discharge through said support ring into said air circulation space, deflector means over said supply outlet to radially divert air toward said support ring along said air circulation space, means forming an annular return air passage surrounding said supply air passage means and having an annular return inlet connected to said supply outlet along said air circulation space and an annular return outlet circumscribing said supply inlet and connected in air return relationship thereto, and air impelling means including a venturi connected to said supply inlet and a forced air jet blowing into said venturi for returning air from said return inlet through said return air passage means to said venturi and for forcing said air sequentially into heat transfer relationship with said heating means and to said supply outlet for heating said utensil, said deflector means, said supply air passage means and said return air passage means having low thermal mass so that the heat output at said air circulation space will be substantially immediately responsive to the energization and deenergization of said heating means.

2. A surface cooking unit for an electric range comprising range top means having an opening therein, an annular sheet material support ring in said opening for supporting a utensil on the top of said range, said support ring and the bottom of said utensil defining a substantially closed air circulation space in said range top means, electrical heating means remote from said air circulation space and positioned in fixed relationship to said support ring in a manner to prevent straight line radiation from said heating means to said air circulation space, a tubular sheet material supply air passage means enclosing said heating means and having a supply inlet adjacent one side of said heating means and a supply outlet directed upwardly in a manner to discharge through said support ring into said air circulation space, means including the bottom of said utensil over said supply outlet to radially divert air toward said support ring along said air circulation space, sheet material means forming an annular return air passage surrounding said supply air passage means and having an annular return inlet connected to said supply outlet along said air circulation space and an annular return outlet circumscribing said supply inlet and connected in air return relationship thereto, and air impelling means including a venturi connected to said supply inlet and a forced air jet blowing into said venturi for returning air from said return inlet through said return air passage means to said venturi and for forcing said air sequentially into heat transfer relationship with said heating means and to said supply outlet for heating said utensil, said supply air passage means and said return air passage means having low thermal mass so that the heat output at said air circulation space will be substantially immediately responsive to the energization and deenergization of said heating means.

3. A surface cooking unit for an electric range comprising range top means having an opening therein, an annular support ring in said opening for supporting a utensil on the top of said range, said support ring and the bottom of said utensil defining a substantially closed air circulation space in said range top means, electrical heating means remote from said air circulation space and positioned in fixed relationship to said support ring in a manner to prevent straight line radiation from said heating means to said air circulation space, a tubular supply air passage means enclosing said heating means and having a supply inlet adjacent one side of said heating means and a supply outlet directed upwardly in a manner to discharge through said support ring into said air circulation space, deflector means over said supply outlet to protect said heating means from spillover occurring at said air circulation space and to radially divert air toward said support ring along said air circulation space, means forming an annular return air passage surrounding said supply air passage means and having an annular return inlet connected to said supply outlet along said air circulation space and an annular return outlet circumscribing said supply inlet and connected in air return relatioship thereto, and air impelling means including a venturi connected to said supply inlet and a forced air jet blowing into said venturi for returning air from said return inlet through said return air passage means to said venturi and for forcing said air sequentially into heat transfer relationship with said heating means and to said supply outlet for heating said utensil, said deflector means, said supply air passage means and said return air passage means having low thermal mass so that the heat output at said air circulation space will be substantially immediately responsive to the energization and deenergization of said heating means.

4. The surface cooking unit of claim 3 wherein said return air passage means includes means in spillover receiving relationship to said air circulation space for conveying said spillover from said surface cooking unit.

5. In combination, an electric cooking range having a range top means including a plurality of openings therein, a surface cooking unit for each of said openings, each of said surface cooking units comprising an annular support ring for supporting a utensil on the top of said range, said support ring and the bottom of said utensil defining a substantially closed air circulation space in said range top means, electrical heating means remote from said air circulation space and positioned in fixed relationship to said support ring in a manner to prevent straight line radiation from said heating means to said air circulation space, a tubular supply air passage means enclosing said heating means and having a supply inlet adjacent one side of said heating means and a supply outlet directed upwardly in a manner to discharge through said support ring into said air circulation space, deflector means over said supply outlet to radially divert air toward said support ring along said air circulation space, means forming an annular return air passage surrounding said supply air passage means and having an annular return inlet connected to said supply outlet along said air circulation space and an annular return outlet circumscribing said supply inlet and connected in air return relationship thereto, and air impelling means including a forced air supply duct means connected to said supply inlet for returning air from said return inlet through said return air passage means to said supply inlet and for forcing said air sequentially into heat transfer relationship with said heating means and to said supply outlet for heating said utensil, said air impelling means including a single remote forced air source discharging toward the forced air supply duct means of each of said cooking units, said deflector means, said supply air passage means and said return air passage means having low thermal mass so that the heat output at said air circulation space will be substantially immediately responsive to the energization and deenergization of said heating means.

References Cited in the file of this patent

UNITED STATES PATENTS

| | | |
|---|---|---|
| 1,455,034 | Small | May 15, 1923 |
| 1,517,764 | Still | Dec. 2, 1924 |
| 1,596,837 | Hopkins | Aug. 17, 1926 |
| 1,758,474 | Seehaus | May 13, 1930 |
| 2,164,265 | Wilson | June 27, 1939 |
| 2,239,957 | Genda | Apr. 29, 1941 |
| 2,501,795 | Stephens | Mar. 28, 1950 |
| 2,908,267 | Hess | Oct. 13, 1959 |

FOREIGN PATENTS

| | | |
|---|---|---|
| 96,164 | Switzerland | Sept. 16, 1922 |
| 341,788 | Great Britain | Jan. 22, 1931 |
| 543,823 | Germany | Feb. 10, 1932 |